Patented Oct. 9, 1951

2,570,353

UNITED STATES PATENT OFFICE 2,570,353

ZEIN INK COMPOSITIONS

Robert M. Leekley, Westport, Conn., assignor to Time, Inc., New York, N. Y., a corporation of New York No Drawing. Application May 25, 1948, Serial No. 29,190

5 Claims. (Cl. 106—24)

This invention relates to improvements in inks and it relates particularly to zein type printing inks which are suitable for high speed printing operations.

The use of zein inks in the printing industry is recognized, and such inks have been found to be very satisfactory for some types of printing. However, due to variations in the surface texture of various types of printing papers, and also difficulty encountered in controlling the body of such inks, they leave something to be desired for use in high speed printing operations. For example, when these inks are used with loose fiber papers, the more viscous or tacky inks of this type have a tendency to pick up paper fibers. Inasmuch as these fibers will also pick up ink and will transfer it to the paper web, small, unwanted specks or spots are printed on the web, an action commonly known as "specking." Also, some of these inks have a tendency to dry on the printing cylinders, thereby making frequent cleaning of the cylinders necessary if uniform copies are to be obtained.

Because of these disadvantages of the prior inks, it was suggested that an additive material, such as, for example, an oily material containing a wetting agent, might be added to the inks to prevent the ink from sticking to the cylinder and also to prevent the ink from picking up the paper fibers. About 20 per cent by weight of a commercially available product consisting of a light petroleum oil containing a small amount of a sulfated vegetable oil was added to the zein inks referred to above and tests were made with these inks. This ink had a lesser tendency to cause "specking," but it had the serious disadvantage that it would not print from a nickel surface. Further changes were made in this ink, for example, by varying the type of zein extract used as the base for the ink. Improvement in the body of the ink was obtained when zein "A" was used instead of conventional zein products. Zein "A" is produced by extracting zein in aqueous iso-propyl alcohol, treating the solution with an alkali such as sodium hydroxide, neutralizing the solution with an acid, such as hydrochloric acid, and then precipitating the zein by drowning it in ice water. However, even the inks containing zein "A" were not entirely satisfactory because they still had a tendency to produce "specking" and they could not be used with cylinders or plates having a nickel printing surface. However, because of the improved characteristics of these inks, it occurred to me that some improvement might be had by using the lubricating and wetting agent in a different proportion, and, in this way, making the ink readily transferable to the plate or cylinder from the applicator and also easily and cleanly transferable from the plate or cylinder to the paper without "specking" even when printing on loose fiber papers.

The principal object of the present invention therefore is to provide a zein base printing ink that can be used, without specking, on printing surfaces formed of copper, nickel or chromium, or surfaces composed of two or more of these metals, as, for example, when a nickel plate is worn partially from a copper cylinder to expose the copper or when a chromium layer is worn partially from an underlying layer of nickel or copper.

Other objects and advantages of the invention will be apparent from the following description of typical inks embodying the present invention.

In accordance with the present invention, I have provided inks having zein as a base and containing a lubricating and wetting agent in an amount to prevent specking and which at the same time renders the ink acceptable and transferable by copper, nickel and chromium printing surfaces.

More particularly, I have found that by adding a suitable lubricating and wetting agent to a zein base ink in an amount between about 2 per cent and about 10 per cent by weight of the ink, specking and irregularity in other printing characteristics can be eliminated. An ink containing between about 2 per cent and 6 per cent of the lubricating and wetting agent is almost ideal, in that the setting time of the ink is excellent, the stability is good and the ink transfers well from all kinds of metal printing surfaces without specking.

The most satisfactory lubricating and wetting agent is one which consists of a light petroleum oil containing about 20 per cent of a sulfated vegetable oil, such as sulfated corn oil, sulfated soybean oil or sulfated peanut oil. Sulfonated mineral oils may be used instead of sulfated vegetable oils.

The petroleum oil may be a white mineral oil, a light petroleum oil or a hydrocarbon solvent of a type having a boiling point of at least 400° F.

The proportion of the sulfated wetting agent to oil or hydrocarbon solvent can be varied between about 10 per cent and 30 per cent.

A typical ink embodying the invention may consist of propylene glycol containing 11 per cent to 20 per cent zein, 15 per cent to 25 per cent pigment and between 2 per cent and 10 per cent of the lubricating and wetting agent.

Specific examples of typical inks which have been used successfully are:

*Example 1*

| | Per cent |
|---|---|
| 19% zein "A" in 85% propylene glycol | 80.5 |
| Carbon black | 17.5 |
| 20% sulfated corn oil—80% hydrocarbon solvent having a boiling point of 440° F | 2.0 |
| | 100.0 |

*Example 2*

| | Per cent |
|---|---|
| 19% zein "A" in 85% propylene glycol | 80.5 |
| Carbon black | 17.5 |
| 20% sulfated corn oil—80% white mineral (Nujol) | 2.0 |
| | 100.0 |

In other similar inks, mixtures of 20 per cent sulfonated mineral oil and 80 per cent white mineral oil, 20 per cent sulfated peanut oil or soybean oil and 80 per cent light lubricating oil were used successfully as the lubricating and wetting agent. Moreover, zein extracts other than zein "A" are also useful inasmuch as the addition of the wetting and lubricating agent does away with the undesirable characteristics of the prior zein inks. All of these inks operate satisfactorily at web speeds of 650 feet per minute without any filling of the printing cylinders or specking of the papers. The ink dries satisfactorily with the usual heating system.

The inks containing sulfated vegetable oils were somewhat superior to the ink containing the sulfonated mineral oil after drying for the reason that they provide an ink film on the paper which is somewhat less sensitive to moisture.

The ink of Example 1 ran very well, but it evaporates somewhat fast for effective lubrication of plates or cylinders used with loose fibered or loosely coated papers. Therefore, inks similar to Example 2 and containing a mixture of a sulfated vegetable oil and a relatively non-volatile hydrocarbon or mineral oil are preferred.

From the preceding description it will be understood that the inks embodying the present invention are susceptible to considerable variation in proportions of ingredients and in the ingredients themselves. Therefore, the examples given above should be considered as illustrative and not as limiting the scope of the following claims.

I claim:

1. A printing ink consisting essentially of a pigment suspended in a solution of zein and containing between about 2 per cent and 10 per cent of a lubricating and wetting composition consisting of between about 70 per cent and 90 per cent of a lubricant of the class consisting of light mineral oils boiling at about 400° F. and between about 10 per cent and 30 per cent of a wetting agent of the class consisting of sulfated vegetable oils and sulfonated mineral oils.

2. A printing ink consisting essentially of between about 15 per cent and 25 per cent of a pigment suspended in a solution of zein and containing between about 2 per cent and 10 per cent of a lubricating and wetting composition consisting of between about 70 per cent and 90 per cent of a light mineral oil, and about 10 per cent and 30 per cent of a sulfated vegetable oil.

3. A printing ink consisting essentially of between about 15 per cent and 25 per cent of a pigment suspended in a solution of zein in propylene glycol and containing between about 2 per cent and 10 per cent of a lubricating and wetting composition consisting of between about 70 per cent and 90 per cent of a light mineral oil and about 10 per cent and 30 per cent of a sulfated vegetable oil.

4. A printing ink consisting essentially of between about 15 per cent and 25 per cent of carbon black suspended in a solution consisting of between about 11 per cent and 20 per cent of zein dissolved in 85 per cent propylene glycol and containing between about 2 per cent and 6 per cent of a lubricating and wetting composition consisting of about 80 per cent white mineral oil and 20 per cent sulfated vegetable oil.

5. A printing ink consisting essentially of about 17.5 per cent of carbon black suspended in a solution of about 19 per cent zein "A" in propylene glycol and containing between about 2 per cent and 6 per cent of a lubricating and wetting agent consisting of about 20 per cent of a sulfated vegetable oil and about 80 per cent of a light mineral oil.

ROBERT M. LEEKLEY.

REFERENCES CITED

The following references are of record in the file of this patent:

UNITED STATES PATENTS

| Number | Name | Date |
|---|---|---|
| 1,096,198 | Schutzer | May 12, 1914 |
| 2,185,110 | Coleman | Dec. 26, 1939 |
| 2,332,066 | Erickson et al. | Oct. 19, 1943 |
| 2,335,882 | Pingarron | Dec. 7, 1943 |
| 2,361,009 | Carman | Oct. 24, 1944 |
| 2,377,237 | James | May 29, 1945 |
| 2,433,029 | Coleman | Dec. 23, 1947 |

FOREIGN PATENTS

| Number | Country | Date |
|---|---|---|
| 471,677 | Great Britain | Sept. 6, 1937 |

OTHER REFERENCES

Ellis, "Printing Inks," (1940) pages 214 to 224. (Copy in Div. 46.)